US008550750B2

(12) United States Patent  
Evans et al.

(10) Patent No.: US 8,550,750 B2
(45) Date of Patent: Oct. 8, 2013

(54) BIOREMEDIATION PROCESS USING LIQUEFIED PETROLEUM GAS

(75) Inventors: Patrick J. Evans, Seattle, WA (US); Karl Hopfensperger, Birmingham, AL (US)

(73) Assignee: CDM Smith Inc., Cambridge, MA (US)

( * ) Notice: Subject to any disclaimer, the term of this patent is extended or adjusted under 35 U.S.C. 154(b) by 227 days.

(21) Appl. No.: 12/991,037

(22) PCT Filed: May 7, 2009

(86) PCT No.: PCT/US2009/002847
§ 371 (c)(1),
(2), (4) Date: Mar. 11, 2011

(87) PCT Pub. No.: WO2010/030312
PCT Pub. Date: Mar. 18, 2010

(65) Prior Publication Data
US 2011/0236136 A1 Sep. 29, 2011

Related U.S. Application Data

(60) Provisional application No. 61/126,904, filed on May 7, 2008.

(51) Int. Cl.
*B09C 1/00* (2006.01)
(52) U.S. Cl.
USPC .................................................. 405/128.75
(58) Field of Classification Search
USPC ............................. 405/128.75, 128.5, 128.7
See application file for complete search history.

(56) References Cited

U.S. PATENT DOCUMENTS

| | | |
|---|---|---|
| 5,124,039 A | 6/1992 | Brautigam |
| 5,602,296 A | 2/1997 | Hughes et al. |
| 5,888,396 A | 3/1999 | Perriello |
| 6,051,130 A | 4/2000 | Perriello |
| 6,110,372 A | 8/2000 | Perriello |
| 6,156,203 A | 12/2000 | Anthony |
| 6,210,579 B1 | 4/2001 | Perriello |
| 6,245,235 B1 | 6/2001 | Perriello |
| 6,488,850 B2 | 12/2002 | Perriello |
| 7,282,149 B2 | 10/2007 | Evans |
| 7,314,548 B2 | 1/2008 | Perriello |
| 7,329,532 B2 | 2/2008 | Perriello |
| 2003/0136735 A1 | 7/2003 | Perriello |
| 2005/0199539 A1* | 9/2005 | Perriello ............ 210/198.1 |
| 2006/0094106 A1 | 5/2006 | Priester, III et al. |
| 2006/0263869 A1* | 11/2006 | Evans ............... 435/262.5 |

OTHER PUBLICATIONS

Http://www.worldlpgas.com/about-lp-gas/faq printed Jan. 2013.*
PCT Application No. PCT/US2009/002847: International Search Report and the Written Opinion mailed Mar. 31, 2010.
PCT Application No. PCT/US2009/002847: International Preliminary Report on Patentability mailed Nov. 18, 2010.

(Continued)

*Primary Examiner* — John Kreck
(74) *Attorney, Agent, or Firm* — Hamilton, Brook, Smith & Reynolds, P.C.

(57) ABSTRACT

A method is provided for stimulating anaerobic degradation of a subsurface contaminant, comprising the steps of vaporizing liquefied petroleum gas (LPG) to form a treating gas and directing the treating gas to at least one subsurface injection site that includes the subsurface contaminant; wherein the treating gas stimulates anaerobic degradation of at least a portion of the subsurface contaminant.

22 Claims, 1 Drawing Sheet

(56) References Cited

OTHER PUBLICATIONS

P. Evans and M. Trute. In Situ Bioremediation of Nitrate and Perchlorate in Vadose Zone Soil for Groundwater Protection Using Gaseous Electron Donor Injection Technology. *Water Environ. Res.* 78:2436-2446 (2006).

H. Cai, R. Brennan, R. Fricke, and P. Evans. Vadose-Zone Treatment of Perchlorate Using Gaseous Electron Donors. Oral Presentation at the Battelle Symposium. May 8, 2007.

P. Evans, H. Cai. R. Brennan, and R. Fricke. In Situ Bioremediation of Perchlorate in Soil Using GEDIT. Poster presentation at the SERDP/ESTCP Partners symposium. Dec. 2007.

Acton Mickelson Environmental, Inc. Technical Memorandum Bioreduction of Perchlorate in Soil Treatability Study, Former Whittaker Ordnance Facility, 2751 San Juan Road, Hollister, California, AME Project No. 21002.13, Oct. 4, 2000.

Envirogen Inc. May 21, 2002. In Situ Bioremediation of Perchlorate. SERDP Project CU-1163. Final Report.

Evans, P. and Brennan, R., "In Situ Bioremediation of Perchlorate in Vadose Zone Soil Using Gaseous Electron Donor Injection Technology (GEDIT)," May 2, 2008.

Evans, P. and Brennan, R., In Situ Bioremediation of Perchlorate in Vadose Zone Soil Using Gaseous Electron Donor Injection Technology (GEDIT), Nov. 7, 2007.

Evans, P., et al., Vadose-Zone Treatment of Perchlorate Using Gaseous Electron Donors. Poster presentation at the Battelle Symposium. May 20, 2008.

Hunter, W.J., "In situ removal of perchlorate from groundwater". In (A. Leeson, B.M. Peyton, J.L. Means, and V.S. Magar, eds.) Bioremediation of Inorganic Compounds Battelle, Press. Columbus, Ohio. pp. 309-314 (2001).

Interstate Technology Regulatory Council, Remediation Technologies for Perchlorate Contamination in Water and Soil, Mar. 2008.

Kastner, J.R., et al., "In-situ bioremediation of perchlorate-contaminated soils". In (A. Leeson, B.M. Peyton, J.L. Means, and V.S. Magar, eds.) Bioremediation of Inorganic Compounds Battelle, Press. Columbus, Ohio. pp. 289-295 (2001).

Logan, B.E. and LaPoint, D., "Treatment of perchlorate- and nitrate-contaminated groundwater in an autotrophic, gas phase, packed-bed bioreactor," *Water Res.* 36:3647-3653 (2002).

Miller, J.P. and Logan, B.E., "Sustained perchlorate degradation in a autotrophic, gas-phase, packed-bed bioreactor," *Environ. Sci. Technol.*, 34:3018-3022 (2000).

O'Niell, W. L., et al., "Feasibililty of in-situ bioremediation of perchlorate-contaminated soils." Abstract submitted to in Situ and On-Site Bioremediation, The Seventh International Symposium, Jun. 2-5, 2003, Orlando, Florida. Session C9.

Rainwater, K., et al., "Design, Construction, and Operation of a Field Demonstration for In Situ Biodegradation of Vadose Zone Soils Contaminated with High Explosives," US Army Corps of Engineers. Engineer Research and Development Laboratory. Environmental Laboratory. ERDC/EL TR-01-28. Sep. 2001.

"Pilot Test Workplace for In-Situ Perchlorate Reduction Using Ethanol at South Building 5 Drywell Area," Jul. 21, 2003.

Thornton, E.C., et al., "In Situ Gaseous Pilot Demonstration—Final Report," Pacific Northwest National Laboratory. Feb. 1999.

US Army Corps of Engineers. Soil Vapor Extraction and Bioventing. Jun. 3, 2002. EM 1110-1-4001.

* cited by examiner

BIOREMEDIATION PROCESS USING LIQUEFIED PETROLEUM GAS

RELATED APPLICATION

This application is the U.S. National Stage of International Application No. PCT/US2009/002847, filed May 7, 2009, which designates the U.S., published in English, and claims the benefit of U.S. Provisional Application No. 61/126,904, filed on May 7, 2008. The entire teachings of the above applications are incorporated herein by reference.

GOVERNMENT SUPPORT

The invention was supported, in whole or in part, by a grant, W912HQ-05-C-0035, from the US Army Corps of Engineers (USACE), Humphreys Engineering Service Center Support Activity, managed by the Department of Defense Environmental Security Technology Certification Program (ESTCP). The United States Government has certain rights in the invention.

BACKGROUND OF THE INVENTION

Perchlorate salts have been and are currently used in solid rocket propellants, such as for launching space shuttles and military missiles. Other uses and sources of perchlorate also exist. Use of perchlorate has resulted in contamination of soil and groundwater. This contamination is of concern because of its associated health risks. The state of California, for example, has a maximum contaminant level (MCL) of 6 parts per billion in water. Perchlorate salts are very soluble in water and thus are capable of being transported long distances in groundwater aquifers. For example, several perchlorate plumes in California are miles in length. Perchlorate in soil can easily be leached into groundwater by infiltrating stormwater. These perchlorate sources in soil overlying groundwater are thus of great concern. Continuing contamination of groundwater by perchlorate sources in soil will result in the need to treat groundwater for extended time periods at greater costs. Treatment of perchlorate sources in soil will result in faster cleanup of groundwater and decreased costs.

In addition, other contaminants that have negative health impacts can leach from soil into groundwater. These contaminants include but are not limited to nitrate salts, nitrite salts, hexavalent chromium compounds, selenium compounds, and chlorinated hydrocarbons.

Several technologies are available for shallow soil treatment. Shallow soil can be excavated and disposed in a landfill. Anaerobic biological treatment is also possible for treatment of shallow soil in situ or ex situ. Technologies for treatment of deep soil are extremely limited and have not been successful. For example, addition of liquid electron donors to deep soil by percolation has been considered but has been limited by channeling of the liquid electron donors through the soil and incomplete contact between electron donor, contaminant (particularly perchlorate), and bacteria. Other technologies that are applicable to deep soil remediation are not generally applicable to the treatment of perchlorate. These technologies include in situ thermal treatment, aerobic biological treatment or bioventing, and soil vapor extraction. Thermal treatment is not applicable to perchlorate because it is stable at typical thermal treatment temperatures. Aerobic biological treatment of bioventing is not applicable to perchlorate because it is biodegraded only under anaerobic conditions. Soil vapor extraction is not applicable to perchlorate because it is not volatile.

The prior art also describes the use of gaseous electron donors, including hydrogen, ethyl acetate, and hexene to promote in situ anaerobic bioremediation of perchlorate and other contaminants in soil. Nevertheless, there is still a need for new methods of bioremediation employing a gaseous electron donor that provides improved treatment of perchlorate contamination and/or other contamination.

SUMMARY OF THE INVENTION

In one aspect, the present invention relates to a method of stimulating anaerobic degradation of a subsurface contaminant, comprising the steps of vaporizing liquefied petroleum gas (LPG) to form a treating gas and directing the treating gas to at least one subsurface injection site that includes the subsurface contaminant; wherein the treating gas stimulates anaerobic degradation of at least a portion of the subsurface contaminant.

In another aspect, the present invention relates to a method of stimulating anaerobic degradation of a subsurface contaminant, comprising the steps of vaporizing LPG, mixing the vaporized LPG with one or more supplemental gaseous electron donors to form a treating gas having an LPG component, and directing the treating gas to a subsurface injection site that includes the contaminant; wherein the treating gas stimulates anaerobic degradation of at least a portion of the contaminant.

In another aspect, the present invention relates to a method of stimulating anaerobic degradation of a subsurface contaminant, comprising the steps of vaporizing LPG, mixing the vaporized LPG with a carrier gas to form a treating gas having an LPG component, and directing the treating gas to a subsurface injection site that includes the contaminant; wherein the treating gas stimulates anaerobic degradation of at least a portion of the contaminant.

In another aspect, the present invention relates to a method of stimulating anaerobic degradation of a subsurface contaminant, comprising the steps of vaporizing LPG, mixing the vaporized LPG with a carrier gas and one or more supplemental gaseous electron donors to form a treating gas having an LPG component, and directing the treating gas to a subsurface injection site that includes the contaminant; wherein the treating gas stimulates anaerobic degradation of at least a portion of the contaminant.

In another aspect, the present invention relates to a method of stimulating anaerobic degradation of a subsurface perchlorate contaminant, comprising the steps of vaporizing LPG, mixing the vaporized LPG with a carrier gas to form a treating gas having an LPG component, and directing the treating gas to a subsurface injection site that includes at least one perchlorate contaminant; wherein the treating gas stimulates anaerobic degradation of at least a portion of the perchlorate contaminant.

In another aspect, the present invention relates to a method of stimulating anaerobic degradation of a subsurface perchlorate contaminant, comprising the steps of vaporizing LPG, mixing the vaporized LPG with one or more supplemental gaseous electron donors to form a treating gas having an LPG component, and directing the treating gas to a subsurface injection site that includes at least one perchlorate contaminant; wherein the treating gas stimulates anaerobic degradation of at least a portion of the perchlorate contaminant.

In another aspect, the present invention relates to a method of stimulating anaerobic degradation of a subsurface perchlorate contaminant, comprising the steps of vaporizing LPG, mixing the vaporized LPG with a carrier gas and one or more supplemental gaseous electron donors to form a treating gas having an LPG component, and directing the treating gas to a subsurface injection site that includes at least one perchlorate contaminant; wherein the treating gas stimulates anaerobic degradation of at least a portion of the perchlorate contaminant.

In another aspect, the present invention relates to a method of preconditioning a vadose zone for perchlorate reduction comprising the step of reducing oxygen concentration by directing vaporized liquefied petroleum gas (LPG) to the vadose zone.

The present invention provides an improved bioremediation process using LPG as a treating gas, thus providing a treatment that is economical, practical for field use, well distributed horizontally and vertically in soil, and promotes biodegradation of a perchlorate contaminant and/or other contaminants.

DETAILED DESCRIPTION OF THE INVENTION

Figure 1:
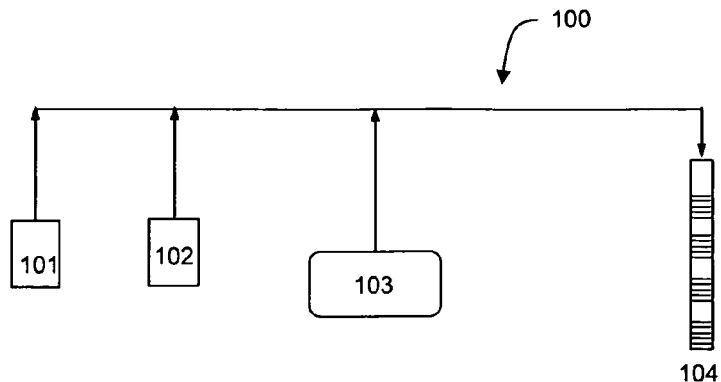
FIG. 1 illustrates a process flow diagram for carrying out embodiments of a the invention.

This invention includes a method for stimulating anaerobic degradation of a subsurface contaminant by directing vaporized LPG to a subsurface site. The subsurface site includes at least one subsurface contaminant and the LPG stimulates anaerobic degradation of at least a portion of the contaminant.

As used herein, the term "contaminant" refers to a material that produces at least one detrimental health effect to a plant or animal species, including human beings. As used herein, the term "stimulating anaerobic degradation" refers to initiating anaerobic degradation of at least one subsurface contaminant or increasing the rate at which one or more subsurface contaminants are anaerobically degraded. By providing a supply of vaporized LPG, the methods of this invention provide for more complete anaerobic degradation of subsurface contaminants and/or degradation a rate that is faster than would occur without this method. The vaporized LPG stimulates or increases the rate at which a subsurface contaminant is aerobically degraded by increasing the rate at which a microorganism utilizes a contaminant in one or more metabolic processes and/or increases the population density of those microorganisms that are able to use the contaminant in one or more metabolic processes.

The methods of this invention can be used to stimulate the bioremediation of a subsurface contaminant. The subsurface contaminant can be located in soil, groundwater, or perched water, including contaminants that are located in relatively shallow soil (e.g., soil that is within about 5 to about 20 feet of the surface) and soil that is deeper below ground level (e.g., greater than 20 feet below the surface). More preferably, the methods are applied to soil or subsurface water that is at least 5 feet below the ground surface. Most preferably, the methods are applied to soil or subsurface water that is at least 20 feet below the ground surface. The maximum depth to which these methods are applicable is only limited by the depth to which a well can be drilled and gas injected into that well. In some embodiments, the methods are applied to soil in the vadose zone.

While the above discussion has focused on perchlorate, other contaminants are of concern. For example, nitrate contamination is widespread because it is a product of fertilizing crops and grass, explosives manufacture, and other processes. Nitrate remediation can be accomplished by methods used for perchlorate remediation and is subject to similar limitations and challenges. The methods of this invention can be applied to any contaminant which a microorganism is able to use as an electron acceptor during at least a portion of one or more metabolic processes and results in the biochemical reduction of the electron acceptor. Examples of contaminants suitable for treatment by the methods of this invention include, but are not limited to, nitrates, nitrites, perchlorates, hexavalent chromium, selenate and selenite salts, and halogenated volatile organic compounds (HVOCs).

Electron Acceptors

Anaerobic bioremediation is remediation by biological degradation or transformation of organic or inorganic compounds in the absence of oxygen. Oxygen is used by some microorganisms for the oxidation of organic or inorganic compounds and is called an electron acceptor. The organic or inorganic compounds that are oxidized are called electron donors or substrates. Anaerobic bacteria use alternative electron acceptors in the absence of oxygen. Some subsurface contaminants, such as perchlorates, nitrates, trichloroethene ("TCE"), and perchloroethene ("PCE"), are known to be alternative electron acceptors, and are thus amenable to anaerobic bioremediation.

Perchlorate ($ClO_4^-$), for example, can serve as an electron acceptor during microbial respiration leading to its ultimate conversion to chloride and water via the following half reaction:

$$ClO_4^- + 8H^+ + 8e^- \rightarrow Cl^- + 4H_2O$$

Nitrates ($NO_3^-$) can also serve as electron acceptors for nitrate-respiring bacteria, also known as denitrifiers, via the following half reaction:

$$2NO_3^- + 12H^+ + 10e^- \rightarrow N_2 + 6H_2O$$

Halogenated Volatile Organic Compounds ("HVOCs"), such as perchloroethene (PCE) and tetrachloroethene (TCE), can also serve as electron acceptors in a process known as reductive dechlorination. This process proceeds stepwise with a single dechlorination occurring at a time as follows:

$$PCE \rightarrow TCE \rightarrow cDCE \rightarrow VC \rightarrow Ethene \rightarrow Ethane$$

where cDCE is cis-1,2-dichloroethene and VC is vinyl chloride. (For simplicity, stoichiometric relations and generation of chloride ion were not shown in the previous equation.) Each reductive step (e.g., from PCE to TCE or from TCE to cDCE) requires two moles of electrons per mole of HVOC as shown in the half reaction for TCE ($C_2HCl_3$) reductive dechlorination to cDCE ($C_2H_2Cl_2$):

$$C_2HCl_3 + H^+ + 2e^- \rightarrow C_2H_2Cl_2 + Cl^-$$

Electron acceptors vary in their susceptibility for reduction based on thermodynamic, kinetic, and microbiological factors. In general, the lower the free energy of reduction, the more reducing or anaerobic the environmental conditions need to be. Oxygen is one of the most easily reduced electron acceptors because it has the greatest free energy of reduction and thus is typically the first electron acceptor to be consumed. Other electron acceptors typically will not be consumed in the presence of oxygen. Nitrate is typically reduced next. HVOCs vary in their ability to be reduced. PCE and TCE are fairly easily reduced to cDCE. Complete reduction to ethene typically requires the existence of very low oxidation-reduction potentials commensurate with methanogenic conditions.

The reductive half reactions that involve soil contaminants (e.g., perchlorate and HVOCs) utilize a companion oxidative half reaction in order to proceed. The oxidative reactions are facilitated with the presence of an electron donor/substrate. It has been discovered that LPG is an excellent gaseous electron donor/substrate. If the soil is contaminated with nitrates, perchlorates, and HVOCs, microbial oxidation of LPG will initially result in the consumption of oxygen, then nitrate. Also, LPG is an excellent electron donor and promotes the necessary conditions for perchlorate reduction. HVOCs will then be reduced along with sulfate (to sulfide) and carbon dioxide (to methane). Complete reduction of HVOCs to ethene will depend on several factors including oxidation-reduction potential, sulfate concentrations, and presence of the requisite bacteria. Other factors, including the concentration of bioavailable ferric iron, another electron acceptor, can affect this reductive reaction in the environment.

LPG as an Electron Donor

Liquified petroleum gas, or "LPG," is a petroleum-derived gas, typically comprised primarily of propane. In addition to propane, LPG can contain additional components, such as other alkanes, alkenes and mercaptans. As used herein, the terms "LPG" and "liquefied petroleum gas" refer to a mixture of at least about 50% propane (by liquid volume) and at least one other component, such as other alkanes, alkenes and mercaptans.

Laboratory testing has demonstrated that LPG promotes the anaerobic biodegradation of nitrate in soil and, when used in combination with a supplemental electron donor, also promotes biodegradation of perchlorate in soil. In addition, LPG has been shown in field tests to achieve better vertical distribution and downward migration in soil when compared to other gaseous electron donors, such as hydrogen. A large radius of influence (e.g., 60 ft) can be achieved using LPG with a low injection flow rate (e.g., 100 cfh). LPG also provides the flexibility for use with or without a carrier gas and with or without a supplemental electron donor.

In addition, LPG is beneficial because it is better dispersed than other electron donors and is very effective in reducing oxygen concentrations. This reduction of oxygen is a requirement for perchlorate reduction. Thus, the LPG can be used to eliminate oxygen and pre-condition the vadose zone for perchlorate reduction upon introduction of the supplemental electron donor. LPG can reduce oxygen concentrations in two very important ways; the first is via displacement and the second is via promoting the growth of aerobic or facultative bacteria that can degrade oxygen.

Description of a Remediation Process Using LPG

LPG is vaporized to form a gas and directed to one or more subsurface sites that include a contaminant. The vaporized LPG is directed to the subsurface site(s) by injection through one or more wells that are screened in one or more desired subsurface zones or locations. In some embodiments, LPG is mixed with a carrier gas to form a treating gas with an LPG component. In further embodiments, LPG is mixed with one or more supplemental gaseous electron donors to form a treating gas with an LPG component. In another embodiment, LPG is mixed with a carrier gas and one or more supplemental gaseous electron donors to form a treating gas with an LPG component. The treating gas is directed to one or more subsurface sites. The amount of LPG mixed with the carrier gas and supplemental gaseous electron donors can be controlled to optimize the process. For example, a treating gas containing LPG and a carrier gas can contain preferably about 1% to about 50% LPG by volume, and more preferably about 10% to about 30% LPG by volume. A treating gas containing LPG and one or more supplemental gaseous electron donors can contain preferably about 50% to about 99.9% LPG by volume, and more preferably about 80% to about 99.8% LPG by volume. A treating gas containing LPG, a carrier gas, and one or more supplemental gaseous electron donors can contain preferably about 1% to about 50% LPG by volume, and more preferably about 5% to about 30% LPG by volume. When the subsurface site is treated with LPG alone, the concentration of LPG is about 100% by volume.

The carrier gas is used as an agent in the delivery of the LPG to the subsurface site. Examples of suitable carrier gases include steam, carbon dioxide, nitrogen, argon, gas, natural gas (i.e., methane) or gases extracted from the subsurface, and mixtures thereof. The metabolic processes of microorganisms that provide for bioremediation of contaminants normally utilize any available oxygen as an electron acceptor before utilizing a contaminant. Therefore, to increase bioremediation efficiency, the amount of the LPG in the treating gas is in stoichiometric excess compared to the amount of any oxygen, thereby ensuring that bioremediation of the contaminant will occur. Optionally, the carrier gas is substantially devoid of oxygen.

In some embodiments, the carrier gas includes steam or water-humidified gas to increase the moisture content of subsurface soil. In still more embodiments, steam or water-humidified gas is injected separately before or after LPG vapor is directed to the subsurface to increase the moisture content of subsurface soil.

In some embodiments, water and/or nutrients are injected with the LPG vapor or as a component of the treating gas to assist microorganisms in the bioremediation processes. In further embodiments, the water and/or nutrients are in a gas phase. Examples of gaseous nutrients include materials that will act as a nitrogen and/or phosphorous source for the microorganism (e.g., amines, ammonia, and nitrous oxide). In further embodiments, one or more species of bacteria are injected into the subsurface to assist in the in situ bioremediation processes.

In some embodiments, a supplemental electron donor is used based on the presence of site-specific perchlorate-reducing bacteria that warrant the use of such supplemental electron donors in addition to LPG. Examples of supplemental electron donors include hydrogen, ethyl acetate, and hexene.

Design of the wells and injection flow rates can be dependent on the specific soil or groundwater matrix used in the method. The LPG, or treating gas if a carrier gas or supplemental electron donor is used, is injected into the soil, groundwater, or perched water through one or more wells that are screened in the desired soil, perched water, or groundwater zone. Design of the well(s) is based on standard engineering methods for soil vapor injection wells and groundwater sparging wells. Spacing of wells and injection flow rates will be dependent on the specific soil or groundwater matrix.

Additional factors to consider during the design of a soil treatment system using this invention include soil permeability, soil moisture, soil organic carbon content, soil vapor oxygen concentration, soil perchlorate concentration, soil nitrate concentration, carrier gas acidity, and carrier gas oxygen concentration. These factors will be used to determine well spacing, flow rates, the specific carrier gas or gases used, and the specific supplemental gaseous electron donors used to result in creation of anaerobic conditions in situ and the ultimate biodegradation of the contaminant(s). Other factors to consider during the design of a groundwater treatment system using this invention include aquifer permeability, groundwater velocity, soil organic carbon content, groundwater dissolved oxygen concentration, groundwater perchlorate concentration, groundwater nitrate concentration, saturated or perched water thickness that is contaminated with nitrate and/or perchlorate, carrier gas acidity, and carrier gas oxygen concentration. These factors will be used to determine well spacing, flow rates, the specific carrier gas or gases used, the specific supplemental gaseous electron donors used, and injection pressure, to result in creation of anaerobic conditions in situ and the ultimate biodegradation of nitrate and/or perchlorate.

FIG. 1 illustrates a process flow diagram for carrying out embodiments of the invention. Equipment set-up 100 includes optional supplemental electron donor source 101, optional carrier gas supply 102, LPG source 103, and one or more injection sites 104. Optional carrier gas supply 102 can include nitrogen or other gases supplied as compressed gas, refrigerated liquid, or via generation by membrane, pressure swing adsorption, cryogenic, or other processes. LPG is added from LPG source 103 containing an internal vaporizer. Injection site 104 is screened either in the groundwater or the soil vertically to result in satisfactory vertical distribution of the electron donor in the soil. Multiple screens can also be employed to establish multiple injection sites within the subsurface area.

Operation can either be continuous or discontinuous. Continuous operation involves injection of LPG continuously until nitrate and/or perchlorate are destroyed and/or no further treatment is required. In situ biodegradation occurs simultaneously with above ground equipment operation. Discontinuous operation involves injection of LPG for a period of time until the desired mass of LPG has been delivered to the soil. Operation of above ground equipment is then stopped and in situ biodegradation is allowed to proceed. Discontinuous operation may be applicable to sites with relatively low permeability such that oxygen back-diffusion into the treatment area does not occur at a high enough rate resulting in cessation of anaerobic conditions.

Optionally, the progress of the bioremediation is monitored by soil gas analysis for nitrous oxide, hydrogen, carbon dioxide, hydrogen sulfide, dinitrogen gas, and/or other gases produced by microorganisms as they metabolize the contaminants.

Example 1

Experimental Set-Up

An industrial site had vadose zone soil containing perchlorate and nitrate. Eight locations were selected at the site and piezometers were installed at each of these locations. The locations were identified as "P1" through "P8." All locations were substantially aligned along one of two transects. Locations P4, P5, P6, P7, and P8 lay in order from south to north along a "north/south" transect, while P4, P3, P2, and P1 lay in order from west to east along an "east/west" transect. The north/south and east/west transects intersected at a southwestern-most point, P4, which was selected as the treatment gas injection site. Table 1 below describes the relative distances of each well location from P4.

TABLE 1

Well Locations (Distance relative to P4)

| NS Transect | | EW Transect | |
|---|---|---|---|
| Well | Distance (ft) | Well | Distance (ft) |
| P4 | 0 | P4 | 0 |
| P5 | 9 | P3 | 5 |
| P6 | 17.5 | P2 | 18 |
| P7 | 36 | P1 | 41 |
| P8 | 54.5 | | |

Locations P3, P4, and P5 lay within the target ten-foot target radius around P4, while the other well locations were beyond the target radius. Each of the locations included piezometers screened at depths of 18, 28, 38, and 48 feet below ground surface (bgs) with the exception of P1, which was screened at 18, 33, 48, and 68 ft bgs. All of the screens were 6 inches in length.

Initial gas compositions were measured at every screen depth in all well locations to establish a base line. Every well location was found to have a gas composition that was similar to that of air (approximately 21% oxygen and 79% nitrogen). All gas compositions in these examples are described on a percent volume gas by percent volume of gas mixture basis unless otherwise noted.

Treatment was conducted by continuously injecting treatment gas into to the 18 and 28 ft bgs screens at the P4 location over a period of 5 months. The treatment gas included a mixture of nitrogen (79%), hydrogen (10%), LPG (10%) and carbon dioxide (1%) by volume. The total flow rate of injection was maintained at 100 cubic feet per hour (cfh) with equal flows to the 18-ft and 28-ft bgs depths.

Treatment Gas Concentration and Oxygen Reduction

Steady state oxygen, hydrogen, and propane concentrations were measured at all locations at the screened depths on a weekly basis. A total of about 22 samples was collected during the five month injection period.

Within the ten foot target radius, oxygen concentrations ranged from 0.04% (±0.14%) to 1.4% (±2.0%) (mean±1 standard deviation). Low oxygen concentrations were surprisingly attainable at depths of 38 and 48 ft bgs even though gas was injected only into the 18 and 28 ft bgs piezometer screens of P4. Oxygen depletion outside of the 10 ft target radius was also observed.

Hydrogen concentrations approaching the injected treatment gas concentration of 10% by volume were most readily obtained at the 18 ft bgs location. Hydrogen concentrations decreased as the depth increased and as the distance from injection increased. Nevertheless, hydrogen was detectable at depths below the point of injection within the 10-ft target radius. This is surprising because the low density of hydrogen causes it to rise rather than sink. Hydrogen concentrations ranged from 0.25% (±0.20%) to 1.1% (±1.7%) by volume at 38 ft bgs and from 0.070% (±0.034%) to 0.11% (±0.16%) at 48 ft bgs. Hydrogen was detected at concentrations greater than one percent at depths of 18 and 28 ft bgs in piezometer P8, located 54.5 feet north east from the point of injection.

Propane was more easily distributed than hydrogen both with respect to distance from injection and depth. Measured propane concentrations within the 10-ft radius ranged from 8.6% (±1.6%) to 9.6% (±2.4%) by volume.

The above results indicate that continuous injection of the $N_2/H_2/LPG/CO_2$ gas mixture resulted in oxygen depletion and electron donor (in this case, hydrogen) distribution within a 10-ft radius especially at depths ranging from 18 to 38 ft bgs. While hydrogen was detected at 48 ft bgs within the 10-ft radius, the concentrations were only about 0.1% by volume. Oxygen depletion and electron donor distribution outside of the 10-ft radius was also observed.

Perchlorate and Nitrate Soil Concentration

During the installation of the injection well and piezometers, soil samples were collected from each well location P1 through P8 at depths of 10, 20, 30, 40, and 50 ft bgs. Additional soil samples were collected at the same depths at three additional locations near the injection point, P4. Using these samples, baseline concentrations of perchlorate and nitrate plus nitrite in soil were determined.

After completion of gas injection, final soil samples were collected directly adjacent to injection well P4 and each piezometer. The distance between the well (P4) or piezometer and each adjacent soil boring ranged from 1.5 to 2.0 feet. The close proximity of the baseline and final soil collection locations minimized complicating effects of soil heterogeneity on data analysis. From the final soil samples, final concentrations of perchlorate and nitrate plus nitrite in soil were determined.

Percent reductions of perchlorate and nitrate were calculated from the baseline and final soil concentrations. Perchlorate removal was consistently greater than 60 percent at distances less than 15 feet from the point of injection except at a depth of 50 ft bgs. At this depth perchlorate removal was inconsistent at all distances from the point of injection. Perchlorate removal was consistent at depths up to 40 ft bgs within a 10-ft radius and the average perchlorate removal was 93% (±9%).

Percent reductions of nitrate illustrate the relative independence of nitrate reduction on distance from the point of injection and depth below ground surface. Unlike perchlorate, nitrate removal was observed both less than and greater than 15 to 20 feet from the point of injection. Nitrate removal was consistently greater than 60 percent for all depths from the point of injection with the exception of a depth of 20 ft bgs. At this depth, nitrate removal was inconsistent at all distances from the point of injection. Nitrate removal was generally consistent with respect to depth and the average nitrate removal based on all data was 90% (±14%).

Figure 2:
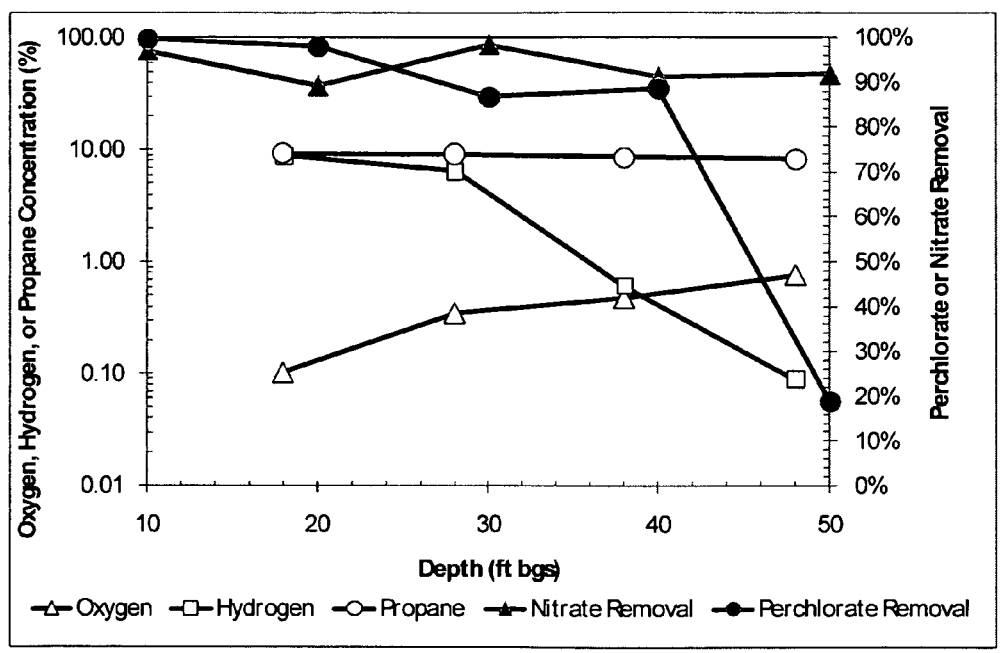
FIG. 2 is a plot illustrating the relationship between contaminant removal and gas composition within a 10-ft radius during mixed $N_2/H_2/LPG/CO_2$ gas injection

Perchlorate reduction was high at depths of 10 to 40 ft bgs and at distances up to at least 10 ft and possibly up to 15 ft away from the point of injection. Perchlorate reduction was not significant at 50 ft bgs and at distances of greater than 15 ft away from the point of injection. There appears to be a relationship between hydrogen concentration and perchlorate removal. Specifically, as shown in FIG. 2, average perchlorate reduction declined from 89% (±4%) to 19% (±38%) as average hydrogen concentration decreased from 0.61% (±0.77%) to 0.09% (±0.07%). That is, at a certain hydrogen concentration threshold between 0.61% (±0.77%) and 0.09% (±0.07%), the treating gas containing hydrogen becomes significantly less effective in reducing perchlorate concentrations in the soil. Unexpectedly, between 30 and 40 bgs, where average hydrogen concentration decreased from 6.5% (±0.9%) to 0.61% (±0.77%), perchlorate reduction did not significantly change; i.e., 87% (±15%) versus 89% (±4%). Thus, perchlorate reduction was supported equally by 0.61% (±0.77%) and 6.5% (±0.9%) hydrogen and high hydrogen concentrations are not required to support significant perchlorate reduction. Hydrogen apparently accelerated perchlorate biodegradation in the presence of LPG.

It was surprising to note that low concentrations of hydrogen (e.g., possibly as low as 0.2%) were capable of accelerating the biodegradation of perchlorate. On the other hand, nitrate reduction was relatively constant indicating that the presence of hydrogen in LPG did not accelerate nitrate reduction.

This example illustrates the effectiveness of LPG mixtures in migrating from an injection location, reducing oxygen gas concentrations, and biodegrading nitrate and perchlorate. Although the target treatment area was a ten foot radius around the point of injection, various components of the treatment gas were found to reach beyond the ten-foot target radius. Reduction in oxygen concentrations were also observed at locations beyond the ten foot target radius. In addition, the treatment gas was found to reduce concentrations of perchlorate and nitrate in the soil samples collected at various depths within the target radius. Reductions in nitrate and perchlorate concentrations were also observed beyond the target radius. Finally, the results indicate that a relationship exists between hydrogen concentration and perchlorate removal.

Example 2

Microcosms comprising soil from a different industrial site contaminated with perchlorate were prepared in serum bottles. Soil from the site initially contained about 5% (weight moisture by weight of soil) and the moisture content was increased to about 16%. Initial perchlorate and nitrate concentrations were 16 mg/kg and 3.9 mg-N/kg respectively. One of four different gas phases were introduced into each of the bottles: 1) pure nitrogen, 2) pure liquefied petroleum gas (LPG), 3) 90% LPG plus 10% hydrogen, or 4) 90% nitrogen plus 10% hydrogen.

Concentrations of perchlorate and nitrate were measured five times over a period of 198 days. The data in Table 2 shows that perchlorate removal occurred in the microcosms with hydrogen plus nitrogen or LPG. Thus, LPG in combination with a supplemental electron donor was capable of supporting perchlorate biodegradation. Table 2 also shows that nitrate removal occurred in all microcosms. While nitrogen gas promoted nitrate removal, LPG accelerated nitrate removal compared to nitrogen gas. Use of hydrogen as a supplemental electron donor in combination with LPG accelerated nitrate removal even more.

TABLE 2

Microcosm Results

| | Gas Composition | | | |
|---|---|---|---|---|
| Day | 100% N2 | 100% LPG | 90% LPG + 10% H2 | 90% N2 + 10% H2 |
| | Perchlorate (mg/kg) | | | |
| 0 | 16 | 20 | 13 | 12 |
| 30 | 17 | 17 | 7.1 | 5.3 |
| 63 | 19 | 18 | 6.5 | 0.9 |
| 155 | 15 | 17 | 3.7 | 3.1 |
| 198 | 16 | 18 | 2.2 | 1.8 |
| | Nitrate + Nitrite (mg-N/kg) | | | |
| 0 | 3.5 | 3.5 | 0.6 | 0.6 |
| 30 | 2.9 | 2.7 | 0.7 | 0.6 |
| 63 | 2.3 | 1.1 | 0.7 | 0.6 |
| 155 | 0.8 | 0.4 | 0.2 | 0.2 |
| 198 | 0.5 | 0.2 | 0.2 | 0.2 |

This example illustrates the effectiveness of LPG mixtures in nitrate removal in soil. It also indicates that including a supplemental electron donor such as hydrogen in an LPG treating gas facilitates perchlorate biodegradation.

While this invention has been particularly shown and described with references to example embodiments thereof, it will be understood by those skilled in the art that various changes in form and details may be made therein without departing from the scope of the invention encompassed by the appended claims.

What is claimed is:

1. A method of stimulating anaerobic degradation of a subsurface perchlorate contaminant, comprising the steps of:
   a) vaporizing liquefied petroleum gas (LPG);
   b) mixing the vaporized LPG with one or more supplemental gaseous electron donors to form a treating gas having an LPG component; and c) directing the treating gas to a subsurface injection site that includes at least one perchlorate contaminant; wherein the treating gas stimulates anaerobic degradation of at least a portion of the perchlorate contaminant.

2. The method of claim 1, wherein the treating gas includes about 50% to about 99.9% vaporized LPG by volume.

3. The method of claim 1, wherein the treating gas includes about 80% to about 99.8% vaporized LPG by volume.

4. The method of claim 1, wherein the vaporized LPG and the one or more supplemental gaseous electron donors are further mixed with a carrier gas to form a treating gas having an LPG component.

5. The method of claim 4, wherein the treating gas includes about 1% to about 50% vaporized LPG by volume.

6. The method of claim 4, wherein the treating gas includes about 5% to about 30% vaporized LPG by volume.

7. The method of claim 4, wherein subsurface injection site includes groundwater.

8. The method of claim 4, wherein the subsurface injection site includes soil.

9. The method of claim 8, wherein the soil is in a vadose zone.

10. The method of claim 4, wherein the subsurface injection site is at least 5 feet below ground surface.

11. The method of claim 4, wherein the subsurface injection site is at least 20 feet below ground surface.

12. The method of claim 4, wherein the treating gas is directed to more than one subsurface injection site.

13. The method of claim 4, wherein at least one nutrient is injected with the LPG.

14. The method of claim 4, wherein the carrier gas includes at least one member of the group consisting of steam, air, carbon dioxide, nitrogen, argon, and gas extracted from the subsurface.

15. The method of claim 4, wherein the carrier gas is substantially devoid of oxygen.

16. The method of claim 4, wherein the carrier gas includes water vapor.

17. The method of claim 1, further including a step of directing water vapor to the subsurface site.

18. The method of claim 1, wherein the supplemental gaseous electron donor is present at a concentration of at least about 0.2% by volume.

19. The method of claim 18, wherein the supplemental gaseous electron donor is hydrogen.

20. A method of stimulating anaerobic degradation of a subsurface perchlorate contaminant, comprising the steps of:
   a) vaporizing liquefied petroleum gas (LPG);
   b) mixing the vaporized LPG with a carrier gas and one or more supplemental gaseous electron donors to form a treating gas having an LPG component; and
   c) directing the treating gas to a subsurface injection site that includes at least one perchlorate contaminant; wherein the treating gas stimulates anaerobic degradation of at least a portion of the perchlorate contaminant.

21. The method of claim 20, wherein the supplemental gaseous electron donor is present at a concentration of at least about 0.2% by volume.

22. The method of claim 21, wherein the supplemental gaseous electron donor is hydrogen.

* * * * *